(12) United States Patent
Chen et al.

(10) Patent No.: US 10,628,676 B2
(45) Date of Patent: Apr. 21, 2020

(54) CONTENT DELIVERY SYSTEM AND METHOD FOR AUTOMATED VIDEO OVERLAY INSERTION

(71) Applicant: TINY PIXELS TECHNOLOGIES INC., Vancouver (CA)

(72) Inventors: June Yan Lin Chen, Richmond (CA); Hsiehyu Fuh, Palo Alto, CA (US)

(73) Assignee: TINY PIXELS TECHNOLOGIES INC., Toronto (CA)

( * ) Notice: Subject to any disclaimer, the term of this patent is extended or adjusted under 35 U.S.C. 154(b) by 99 days.

(21) Appl. No.: 16/105,490

(22) Filed: Aug. 20, 2018

(65) Prior Publication Data

US 2019/0138810 A1    May 9, 2019

Related U.S. Application Data

(60) Provisional application No. 62/550,077, filed on Aug. 25, 2017.

(51) Int. Cl.
*G06K 9/62*   (2006.01)
*G06K 9/00*   (2006.01)
*G06Q 30/02*  (2012.01)
*G06T 11/60*  (2006.01)

(52) U.S. Cl.
CPC ..... *G06K 9/00718* (2013.01); *G06Q 30/0242* (2013.01); *G06K 9/00765* (2013.01); *G06K 9/623* (2013.01); *G06K 9/6268* (2013.01); *G06T 11/60* (2013.01)

(58) Field of Classification Search
CPC ........... G06K 9/00718; G06K 9/00765; G06K 9/4628; G06K 9/623; G06K 9/6268; G06K 9/6274; G06Q 30/0242; G06T 11/60
See application file for complete search history.

(56) References Cited

U.S. PATENT DOCUMENTS

| 8,131,118 B1* | 3/2012 | Jing | G01C 21/20 |
| | | | 382/305 |
| 2007/0011702 A1* | 1/2007 | Vaysman | H04N 21/84 |
| | | | 725/45 |
| 2017/0278289 A1* | 9/2017 | Marino | G06T 7/44 |
| 2018/0143748 A1* | 5/2018 | Ahmed | H04N 21/4312 |
| 2018/0315076 A1* | 11/2018 | Andreou | G06F 16/951 |

OTHER PUBLICATIONS

Googl scholar search.*

* cited by examiner

*Primary Examiner* — Xin Jia
(74) *Attorney, Agent, or Firm* — Bhole IP Law; Anil Bhole; Marc Lampert

(57) ABSTRACT

There is provided a system and method for automated overlay insertion to a video. The method includes: associating each overlay with one or more overlay categories; detecting scene categories within each frame and a confidence probability value; adjusting the confidence probability values based on preceding frame groupings; matching overlay categories to comparable adjusted scene categories; generating a selection score for each overlay category that is relative to the probability value for the matched adjusted scene category; randomly selecting an overlay from the one or more overlays, the probability for each overlay based on the respective selection score; and inserting the selected overlay into the video.

20 Claims, 15 Drawing Sheets vegetation Score: 0.923870
leaf Score: 0.900997
field Score: 0.857859
aerial photography Score: 0.855095
wilderness Score: 0.850619 vegetation Score: 0.999362
leaf Score: 0.988986
nature Score: 0.956784
bird's eye view Score: 0.908084
yellow Score: 0.902707 bird's eye view Score: 0.990333
grassland Score: 0.985291
nature reserve Score: 0.979596
sky Score: 0.978151
plain Score: 0.974538

CONTENT DELIVERY SYSTEM AND METHOD FOR AUTOMATED VIDEO OVERLAY INSERTION

TECHNICAL FIELD

The following relates generally to video processing, and more specifically, to a content delivery system and method for automated video overlay insertion.

BACKGROUND

Playback of video content, whether streamed or downloaded, has become ubiquitous.

It has become common to place additional static or dynamic graphical elements over displayed video content, such additional elements being referred to as an "overlay". Overlays are often positioned along the bottom of an image frame and may present advertising or other information, such as subtitling or timely alerts, whether or not related to the content.

For illustration, while viewing a web-based streaming video, an overlay is often positioned along the bottom of the video frame, and displays advertising for goods or services intended to be relevant to the video viewer. Often, such an overlay is shown throughout the video playback or may be shown through part of it until the viewer clicks a checkbox indicating a desire for the overlay to close.

Particularly in the context of online advertising, it is often desirable for overlays to provide content relevant to the user. However, without manual intervention, appropriate selection is problematic.

It is therefore an object of the present invention to provide automated overlay insertion in which the above disadvantages are obviated or mitigated and attainment of appropriate overlay selection is facilitated.

SUMMARY

In an aspect, there is provided a method for automated overlay insertion to a video, the method comprising: receiving the video and one or more overlays, the video comprising a plurality of individual frames grouped in frame groupings; associating each overlay with one or more overlay categories; for each frame grouping in the plurality of frames, passing the visual contents of the frame to a trained convolutional neural network, the convolutional neural network is trained to detect scene categories within each frame and a confidence probability value associated with each detected scene category; successively for each of the frame groupings, adjusting the confidence probability values associated with the respective scene categories for a current frame grouping based on preceding frame groupings, by: determining a confidence probability for a scene category as a union of the confidence probability for such scene category for the current frame grouping and the confidence probability for such scene category for the preceding frame grouping if such scene category was detected in the preceding frame grouping and detected in the current frame grouping; and multiplying the probability value for each scene category by a predetermined scale down factor if such scene category was detected in the preceding frame grouping and not detected in the current frame grouping; matching overlay categories to comparable adjusted scene categories; generating a selection score for each overlay category that is relative to the probability value for the matched adjusted scene category; randomly selecting an overlay from the one or more overlays, the probability for each overlay based on the respective selection score; and inserting the selected overlay into the video.

In a particular case, each frame grouping comprises one frame.

In another case, the method further comprising determining a plurality of scenes in the video, each scene comprising one or more frames, each scene is delineated from a preceding scene when one or more scene categories detected in a preceding frame are not detected in a current frame, wherein adjusting the confidence probability values, generating the selection score, randomly selecting the overlay, and inserting the selected overlay are executed separately for each scene.

In yet another case, scene categories are only considered detected if the associated confidence probability value is above a predetermined threshold probability.

In yet another case, the predetermined scale down factor is greater than the predetermined threshold probability.

In yet another case, an overlay is only selected if the duration of the overlay is less than or equal to the duration of the respective scene.

In yet another case, the method further comprising normalizing all the selection scores for the respective scene by applying a Softmax function to such selection scores such that such selection scores add up to one.

In yet another case, the selection score is further relative to revenue generated by displaying the respective overlay.

In yet another case, associating each overlay with one or more overlay categories comprises receiving overlay categories for each overlay from a user.

In yet another case, the predetermined scale down factor is 1 except when the respective scene category was not detected for at least a predetermined number of preceding frames in which case the predetermined scale down factor is less than 1.

In another aspect, there is provided a system for automated overlay insertion to a video, the system comprising one or more processors and a data storage, the data storage storing the video and one or more overlays, the video comprising a plurality of individual frames grouped in frame groupings, the one or more processors in communication with the one or more memory units and configured to execute: an overlay management module to associate each overlay with one or more overlay categories; a storyline generator module to, for each frame grouping in the plurality of frames, pass the visual contents of the frame to a trained convolutional neural network, the convolutional neural network is trained to detect scene categories within each frame and a confidence probability value associated with each detected scene category, and to successively for each of the frame groupings, adjust the confidence probability values associated with the respective scene categories for a current frame grouping based on preceding frame groupings, by: determining a confidence probability for a scene category as a union of the confidence probability for such scene category for the current frame grouping and the confidence probability for such scene category for the preceding frame grouping if such scene category was detected in the preceding frame grouping and detected in the current frame grouping; and multiplying the probability value for each scene category by a predetermined scale down factor if such scene category was detected in the preceding frame grouping and not detected in the current frame grouping; an overlay selector module to match overlay categories to comparable adjusted scene categories, to generate a selection score for each overlay category that is relative to the probability value for the matched adjusted scene category, and to randomly select an overlay from the one or more overlays, the probability for each overlay based on the respective selection score; and an overlay insertion module to insert the selected overlay into the video.

In a particular case, each frame grouping comprises one frame.

In another case, the storyline generator module further determines a plurality of scenes in the video, each scene comprising one or more frames, each scene is delineated from a preceding scene when one or more scene categories detected in a preceding frame are not detected in a current frame, wherein adjusting the confidence probability values, generating the selection score, randomly selecting the overlay, and inserting the selected overlay are executed separately for each scene.

In yet another case, scene categories are only considered detected if the associated confidence probability value is above a predetermined threshold probability.

In yet another case, the predetermined scale down factor is greater than the predetermined threshold probability.

In yet another case, an overlay is only selected if the duration of the overlay is less than or equal to the duration of the respective scene.

In yet another case, the overlay selector module further normalizes all the selection scores for the respective scene by applying a Softmax function to such selection scores such that such selection scores add up to one.

In yet another case, the selection score is further relative to revenue generated by displaying the respective overlay.

In yet another case, associating each overlay with one or more overlay categories comprises receiving overlay categories for each overlay from a user overlay management module.

In yet another case, the predetermined scale down factor is 1 except when the respective scene category was not detected for at least a predetermined number of preceding frames in which case the predetermined scale down factor is less than 1.

These and other embodiments are contemplated and described herein. It will be appreciated that the foregoing summary sets out representative aspects of systems and methods for automated overlay insertion to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
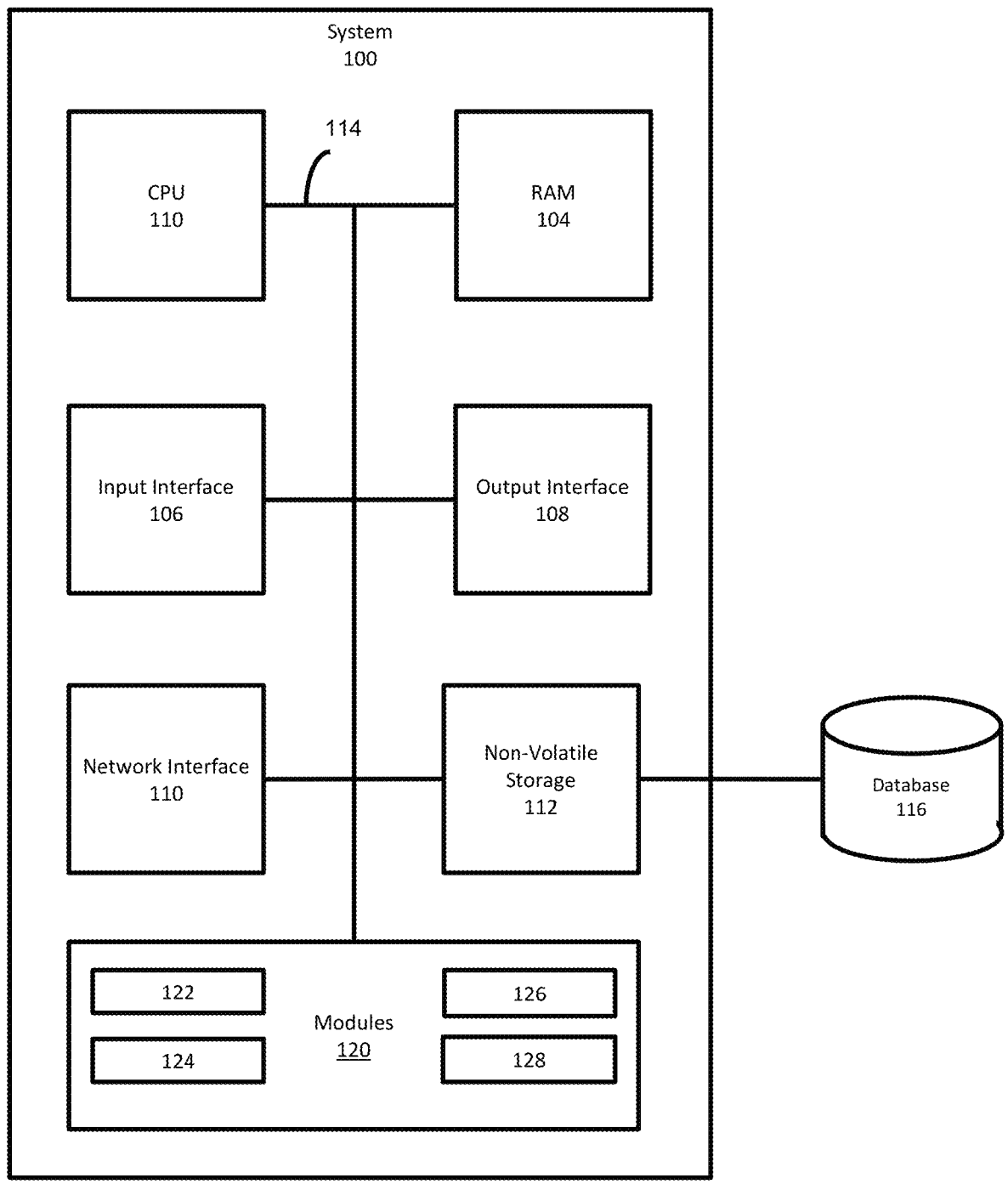
FIG. 1 is a schematic diagram of a content delivery system for automated overlay insertion in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Overlay selection in some content delivery systems may be manual, or may be based on known characteristics of the viewer (or similar viewers) from their web history or profile, or information linked to the video content, such as descriptive text or metadata tags. Such content delivery systems may be deficient in that they fail to perform any analysis of the video content itself in order to select an appropriate overlay, instead relying on external information.

Further, many types of video content have different scenes, each of which may have significantly different characteristics in that each may feature different objects and situations (e.g. scene A shows boy, prominent actor on-screen, cell-phone technology on screen; scene B shows girl, car technology on screen), these characteristics are referred to throughout as "scene categories".

Some content delivery systems can be deficient in that overlays are selected based on information external to the video that indicate characteristics of the video as a whole, rather than considering each of the scenes.

As described above, some content delivery systems can be problematic in that they perform selection of an overlay without any consideration, or without sufficient consideration, of the content of a video; relying instead on manual selection or external information about the video. In the embodiments described herein, Applicant solved the technical problem of selecting a more favorable overlay by, at least, considering the particular characteristics of a video and its scenes.

As described in more detail in the following, a content delivery system 100 performs automatic overlay insertion by selecting an overlay based on an analysis of the video itself. The system first automatically processes a video using a storyline generator module to: analyze the video using a computer vision technique to generate scene categories for each frame; merge the categorization of successive frames to provide a frame-level storyline for the video; and, further segment the frame-level storyline into a scene-level storyline comprising scenes and scene-level categories.

Given the scene-level storyline, a set of overlays with known characteristics, and selection criteria, an overlay selector module selects an overlay for each video, or more particularly for each scene therein. The selected overlays can thereafter be automatically inserted by an overlay insertion module at determined insertion points to the video, such that the video (or one or more scenes therein) plays back along with the selected and inserted overlays. Insertion may be accomplished subsequent to the proposed selected overlay(s) being presented to the user for approval. Accordingly, the system described herein can advantageously be used to automatically select and insert one or more overlays to a video.

The overlay selection criteria can at least include relatedness of subject matter of the video (or its scenes) and the overlay, determined based on scene categories of the video, and overlay categories of the overlay. Further, in some embodiments, where the system is used to insert overlays for advertising purposes, the selection criteria can include maximizing revenue, such revenue varying depending on the selected overlay.

Though the system is not so limited, many embodiments in the following are described with reference to overlays comprising advertising content for clarity of illustration.

Figure 2:
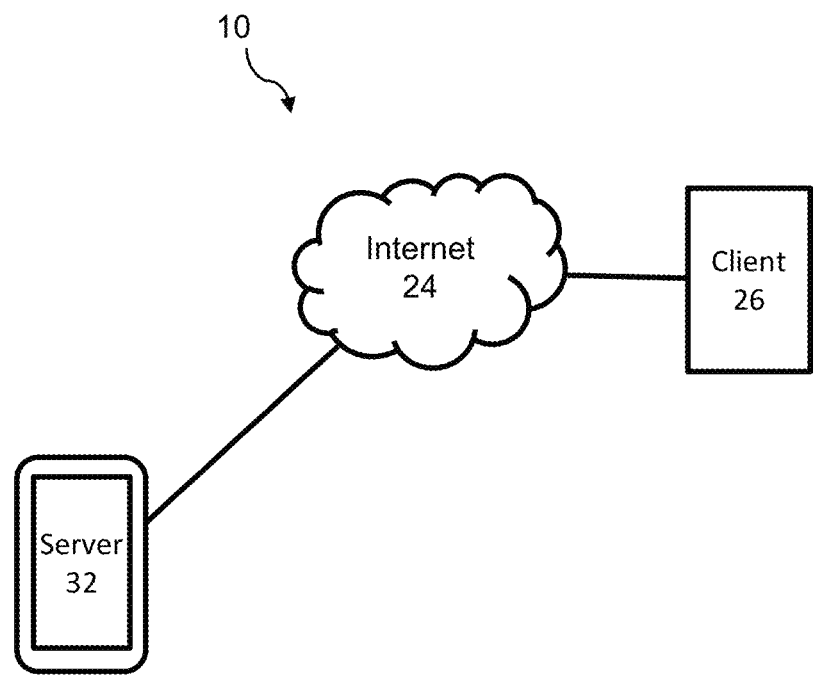
FIG. 2 is a schematic diagram showing the system of FIG. 1 and an exemplary operating environment.

Referring now to FIG. 1, a content delivery system 100 for automated video overlay insertion, in accordance with an embodiment, is shown. In this embodiment, the system 100 is run on a server. In further embodiments, the system 100 can be run on any other computing device; for example, a desktop computer, a laptop computer, a smartphone, a tablet computer, a point-of-sale ("PoS") device, a smartwatch, or the like. Preferably, the system 100 is run on a server (32 in FIG. 2) and accessed by a client device (26 in FIG. 2) having a visual interface permitting a user to easily manage system functions, including selection and manipulation of video media and potential overlay sequences, as will be explained below; such a visual interface would typically include a display of at least several inches in diameter. Such an embodiment is typical of a web-based client interface for accessing a cloud-based server implementation.

FIG. 1 shows various physical and logical components of an embodiment of the system 100. As shown, the system 100 has a number of physical and logical components, including a central processing unit ("CPU") 102 comprising one or more processors, random access memory ("RAM") 104, an input interface 106, an output interface 108, a network interface 110, non-volatile storage 112, and a local bus 114 enabling CPU 102 to communicate with the other components. CPU 102 executes an operating system, and various modules 120, as described below in greater detail. RAM 104 provides relatively responsive volatile storage to CPU 102. The input interface 106 enables an administrator or user to provide input via an input device, for example a keyboard and mouse. The output interface 108 outputs information to output devices, such as a display and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution. In various embodiments, the system comprises a web accessible API, such as a REST API, for facilitating access by the user at the client device to server functionality, including the various modules. The job queue created in the API server can be handled by the CPU or distributed, for example among scalable on-demand GPU cloud computing servers.

In an embodiment, to achieve the functionality described above, and as described in more detail in the following, the system includes a series of modules 120, including an overlay management module 122, a storyline generator module 124, an overlay selector module 126 and an overlay insertion module 128. The overlay management module 122 permits manipulation of media by a user of the system, enabling the user to configure a list of overlays that can be selected by the system for insertion. The storyline generator module 124 accepts a video, processes the video with a computer vision technique, and outputs a storyline of one or more scenes with associated scene categories and confidence probability values for the categories. The overlay selector module 126, given the storyline, the set of overlays and selection criteria, selects a set of overlays along with a list of insertion points within the video. The overlay insertion module 128 produces an output with the selected overlays inserted at the determined insertion points.

Figure 3:
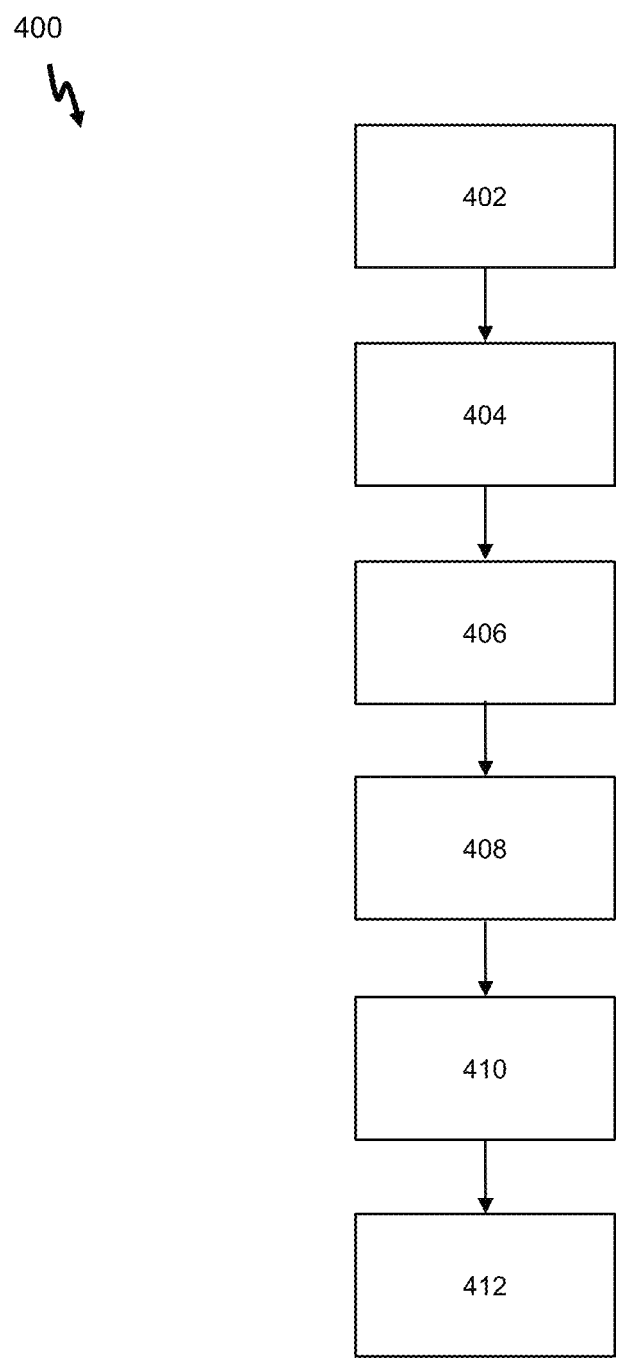
FIG. 3 is a flow chart of a method for automated overlay insertion in accordance with an embodiment.

Referring to FIG. 3, content delivery method 400 for automated overlay insertion is executed by the modules 120 and will be described in more detail in the following. Method 400 comprises, at block 402, receiving, by an overlay management module, a video, a set of overlays as well as overlay characteristics comprising overlay categories. At block 404, processing, by a storyline generator module, a plurality of frames of the video with a computer vision technique to generate, for each frame, one or more scene categories and a confidence probability value of each category. At block 406, in some cases, connecting the scene categories and confidence values between frames to generate a storyline (at the frame level), by adjusting each successive frame based on scene categories and confidence probability values of previous frames. At block 408, determining from the frame level storyline, a scene level storyline comprising scenes and associated scene categories and confidence probability values. At block 410, determining, by an overlay selector module, a set of insertion points for a subset of overlays selected for insertion to the storyline based on a selection criteria. At block 412, inserting, by an overlay insertion module, the subset of selected overlays to the video at the insertion points.

Figure 4:
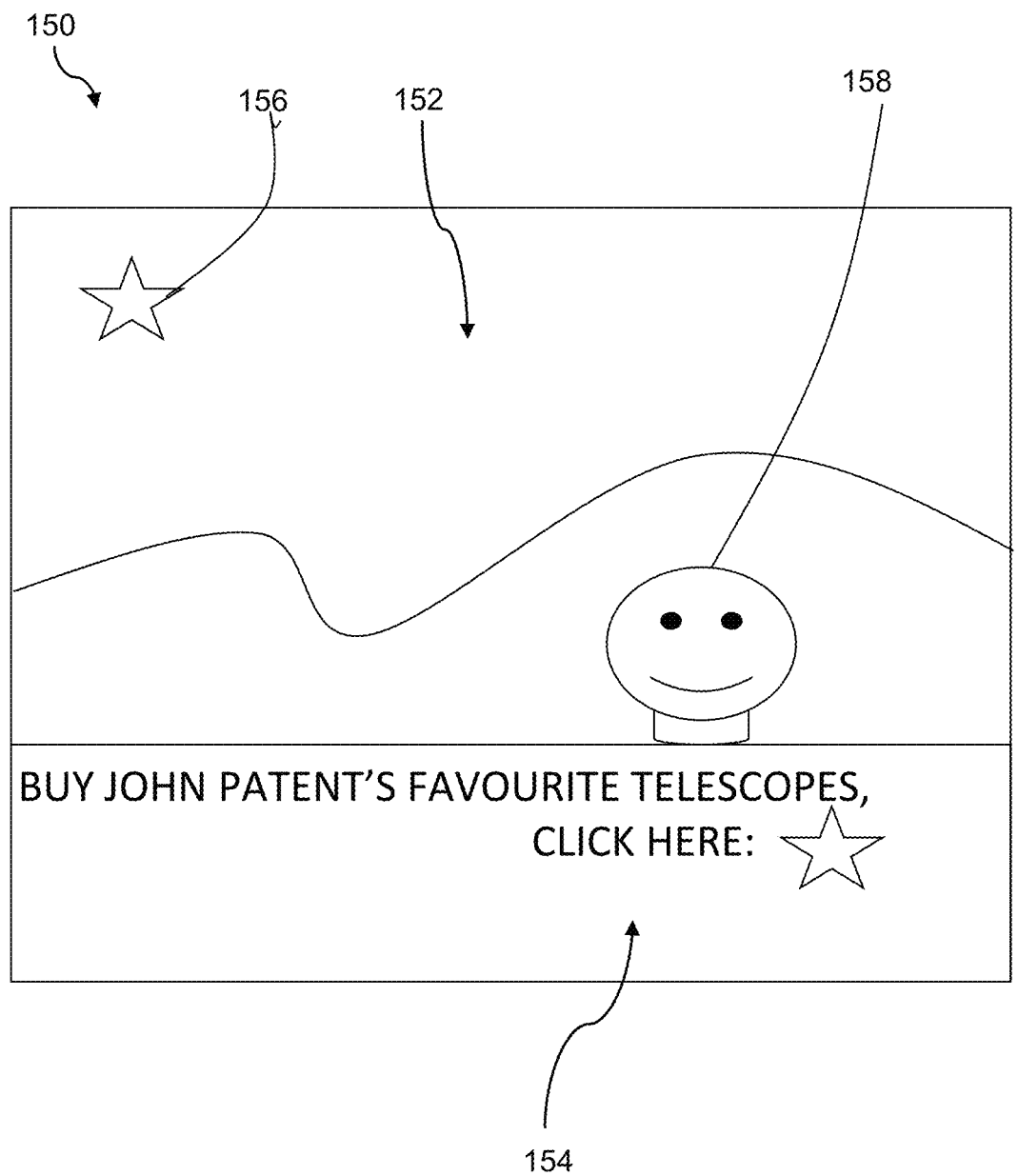
FIG. 4 is an illustration of a frame of a video with an overlay inserted.

For an exemplary illustration of overlays and scene characteristics for reference in the following, an example frame 150 from a video with an overlay inserted therein by the overlay insertion module is shown in FIG. 4. An inserted overlay 154 is shown to obstruct a bottom portion of the video, with element 152 showing remaining unobstructed video content. Two characteristics scene features 156 and 158 are shown relating to possible scene categories. Element 156 relates to an astral body. Element 158 relates to an illustrative fictional movie star "John Patent". The overlay is shown to relate to the scene categories.

Each of the modules and blocks of the method 400 will now be described in additional detail.

Referring first to the overlay management module 122, the module enables selection and manipulation of media by a user of the system from a client device within a graphical user interface provided by the system.

The overlay management module 122 provides a workspace for the user within a graphical user interface, and enables the user to upload overlays and videos that they desire to use in association with the system. Additional overlays may be stored on the system for use by all or some users. The overlay management module permits manipulation of stored media, including to selectively trigger the functionality described herein for a desired video and set of overlays. Accordingly, the user can access functionality of the overlay management module to indicate which overlays to select from for insertion into a particular video. Any media accessed by the modules, including the overlay management module, may be stored in the database 116 once uploaded.

Any overlay stored by the system comprises the overlay media, along with overlay characteristics. The overlay media comprises a media file of each overlay's visual content; in an example, the overlay media can comprise a video of a spinning soft drink bottle. Overlay characteristics include metadata relating to each overlay; for example, overlay temporal duration and overlay categories. In some cases, temporal duration may be in seconds. With respect to overlay categories, as described above, video content often has a series of scenes throughout its length, each having different scene categories relating to prominently featured elements; for example, young girl, young boy, visually bright, teenage girl, teenage boy, famous actor John Patent onscreen, cat dog, golden retriever. The stored overlay categories of an overlay relate to video scene categories for which the overlay will be relevant; for matching the overlay to particular scenes of a video based on the respective categories to assist with selection of overlay(s) for insertion. The overlay categories may be manually input, in some cases, by selecting from a stored list of possible categories to encourage a match with a list of possible scene categories stored by the system (and drawn from by the computer vision technique described herein). In some cases, the overlay categories can be English strings.

The system thus preferably receives from the user a list of overlay characteristics for each uploaded overlay. Though the overlay characteristics can be provided by the user, in some cases, characteristics may be determined by the system, whether upon upload, or when an overlay is desired to be used by the user. The overlay categories, along with a confidence probability of each category, can be determined by a categorization technique in a similar manner to how the video scene categories are determined, as described herein. Duration may be determined based on the uploaded visual content.

In an alternative embodiment, the functionality of the overlay management module may be enabled through provision by the system of an API rather than a graphical user interface.

Referring now to the storyline generator 124, generally, the storyline generator module is configured to accept a given video and output a storyline comprising a plurality of frames with associated categories and confidence probabilities for the frame-level categories, as well as a set of scenes with associated categories and confidence probabilities for the scene-level categories.

Figure 5:
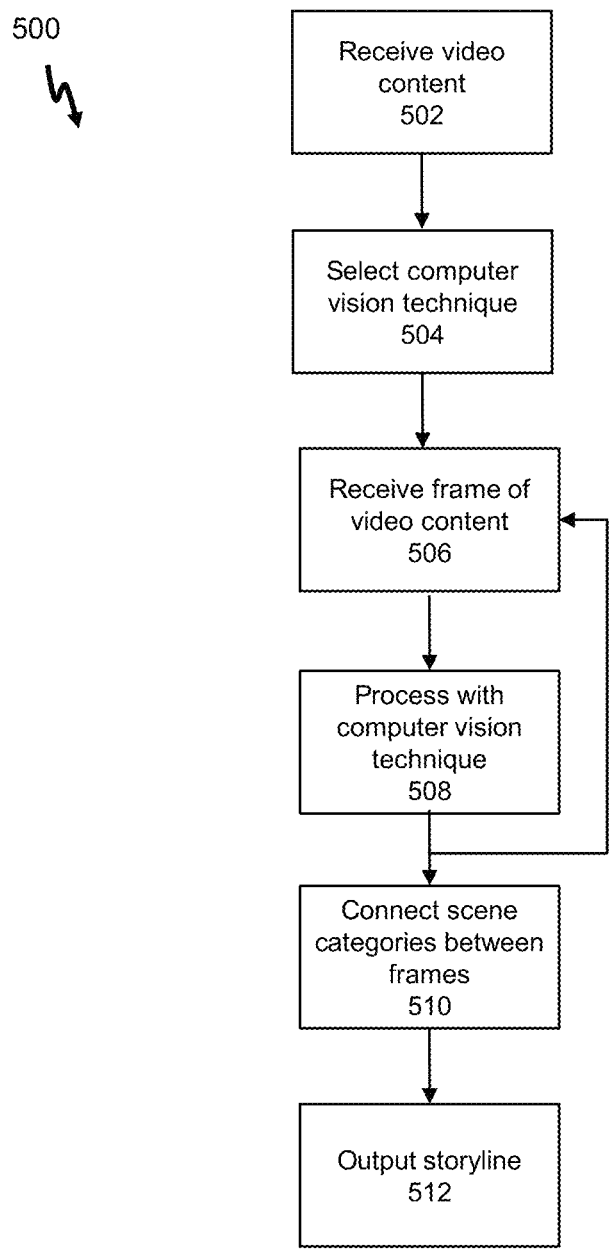
FIG. 5 is a flow chart of a method for automated storyline generation in accordance with an embodiment.
Figure 6:
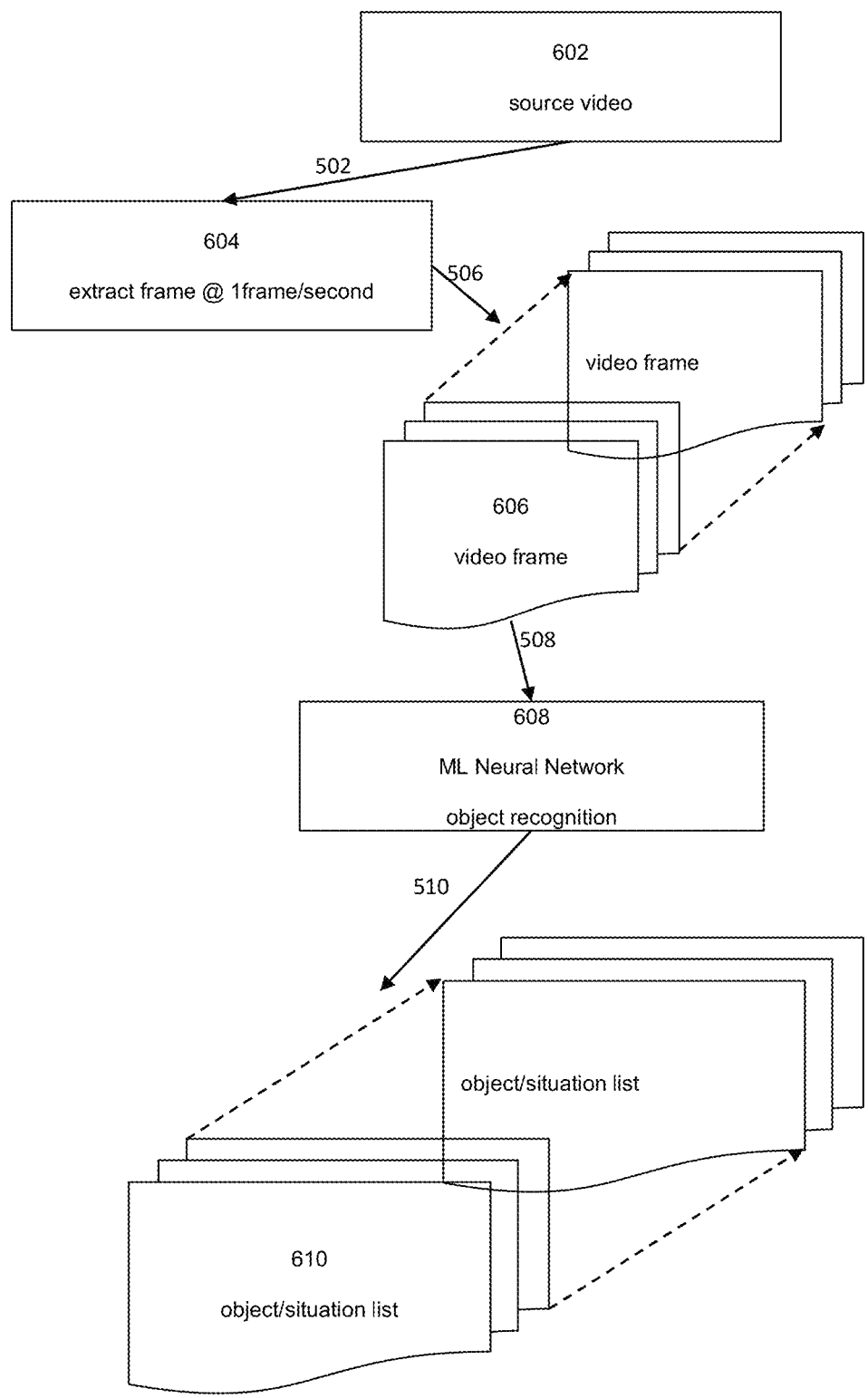
FIG. 6 is a flow chart illustrating an embodiment of the method for automated storyline generation of FIG. 5.

Referring to FIG. 5, a storyline may be generated by the storyline generator module 124, for example, in accordance with method 500. The method 500 proceeds by, at block 502, receiving video content. At block 504, a computer vision technique is selected. At block 506, a first frame of the video is received for analysis (not necessarily the numerically first frame of the video). At block 508, the computer vision technique is applied to recognize objects and situations depicted in the frame, and generate an output comprising a list of objects and situations depicted from the image frame (frame-level scene categories). Each object or situation of the scene categories may be, like the overlay categories, an English string. In some cases, the computer vision technique can be executed by a cloud computing service; for example, Google™ Vision API. In other cases, the computer vision technique can be executed using an object detection ML (Machine Learning) neural network; for example, "imagenet" or "mobilenets". Depending on the vision technique, a confidence probability value can be generated and stored for each identified object or situation. The computer vision technique will then continue processing additional frames of the video at a predetermined interval (e.g. 1 frame/second of video) until the end of the video. At block 510, a context-awareness technique, such as the technique 800 described herein, is used to automatically associate the list of scene categories from each frame and develop a storyline for the video from these frame-level scene categories, including determining transitions between scenes based on changes to the detected categories over time. At block 512, with a storyline developed, fields may be populated by the module for a set of determined scenes within a video; for example, at least start time, end time and scene categories. Start time and end time refer to, respectively, the start time and end time of a determined scene within a video. Scene categories, as described herein, refer to a list of objects and situations within each scene (in some cases, in each frame). In some cases, a confidence probability of each category may also be stored. In some cases, the storyline including scenes and scene categories may be stored as a searchable database for the video. FIG. 6 shows another view of the method 500 applied to a source video 602. Individual frames 604 are extracted, which collectively provide a set of video frames 606. Each frame is processed using a computer vision technique 608, and a list of scene categories 610 for each frame is generated.

Figure 7:
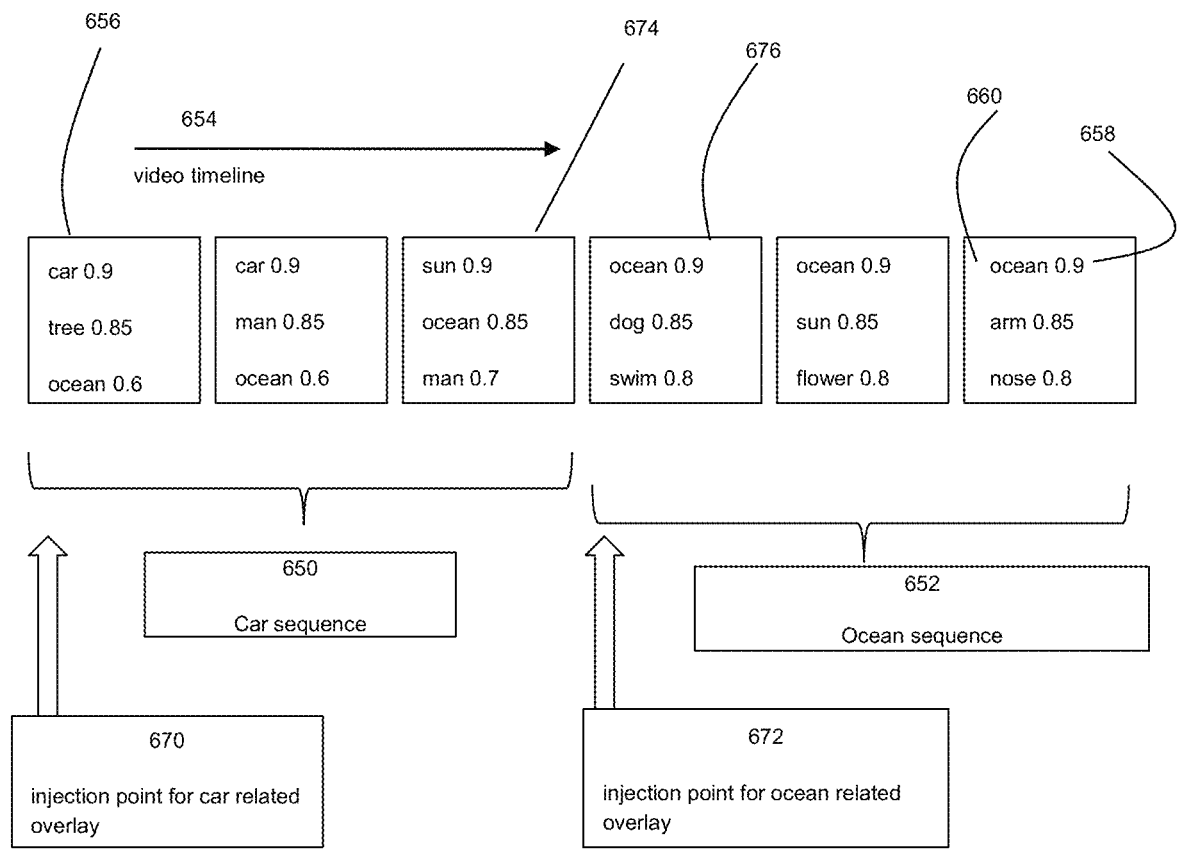
FIG. 7 illustrates the application of the method of FIG. 5 to a video.
Figure 8:
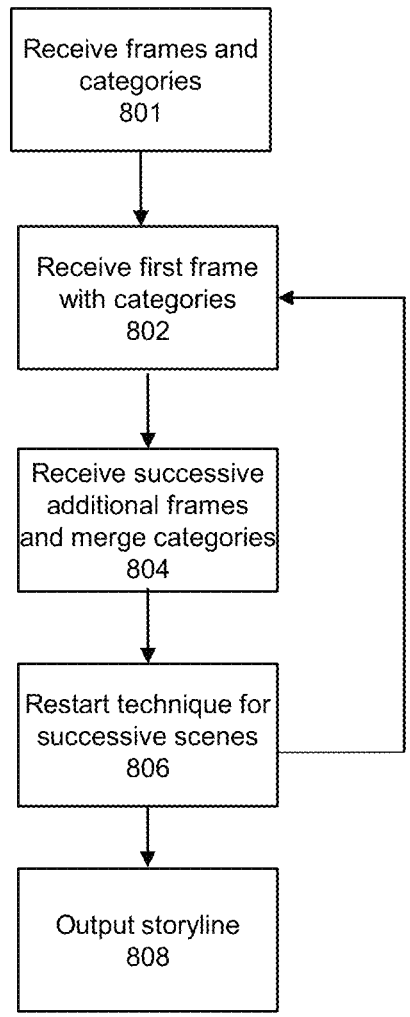
FIG. 8 is a flow chart of a context awareness method for connecting scene categories between frames.

FIG. 7 illustrates application of a particular embodiment of method 500 for an example video having a timeline 654. Through use of a computer vision technique, a set of categories 660 and confidence probability values 658 for the categories can be determined for each frame (example frames shown at 656, 674, 767). A context awareness method, such as method 800 can be used to connect the listed categories to establish scenes 650, 652, illustratively showing a car sequence and an ocean sequence. As will be explained in more detail below with respect to the overlay selector module, blocks 670 and 672 show that selected overlays may be inserted and shown throughout the length of each scene. In the illustrated example, the selection criteria for insertion of the overlays comprises relevance to the scenes, such that a car-related overlay 670 is shown during the car sequence 650 and an ocean-related overlay 672 is shown during the ocean sequence 652. Referring now to FIG. 8, a context awareness method 800 for connecting scene categories between frames for building a storyline of a video is shown, as may be carried out at block 510 of method 500. The technique is applied subsequent to processing of video frames by the computer vision technique, which generated frame-level scene categories and confidence probability values (carried out at block 508).

In some cases, image categorization techniques, for example as applied at block 508, can act on individual images or frames of video; for example, Imagenet relies on CNN (convolutional neural networks). In general, such techniques are generally designed for accuracy and execution speed when categorizing images among hundreds to tens of thousands of categories. In some cases, however, these techniques may not take into account the temporal and sequential nature of video scene classification. Particularly, such that each frame within a video being categorized independently of each other. Some techniques for video categorization can utilize methods such as RNN (recurrent neural networks) to analyze videos and include the temporal characteristics of categorization. However, in practical terms, RNNs have a much higher execution cost and lower accuracy than CNNs; therefore, RNNs may be more useful in embodiments where the categorizing is on a video as a whole or on sections of a video, rather than on a per-frame or near per-frame basis. The method 800, as described herein, utilizes certain benefits of CNN image categorization and applies them to determine video scene categorization. Advantageously, this can yield accurate scene categorization at a lower execution cost than the alternatives.

In this way, the system utilizes the CNN to provide accurate per-frame categorization. In this manner, the system can dissect a video into pieces to find scenes of better categorized continuous frames for inserting an overlay. In some cases, the CNN can be further trained using manual supervision of the outcomes. Advantageously, in many of the present embodiments, the computing resources required for high accuracy of the neural network in determining the categories for a frame may not be required because the system can filter out noise from the frame categorization, as described herein, and thus can build continuous storylines with only categories meeting a threshold.

At block 801, a set of frames and associated scene categories and confidence probability values are received. At block 802, a first frame is selected (not necessarily the numerically first frame). The categories and confidence probability values of the first frame are used to initiate a category list for a frame-level storyline. This is illustrated in FIG. 7 by the frame 656. The video starts with detected categories and probabilities: "car" 0.9, "tree" 0.85, "ocean" 0.6. The detected categories can be, for example, any contents, objects, background, environment, or the like, located in the frame. All detected categories from the first frame may be kept to provide the initial category list to start the storyline, or a predetermined threshold may be applied such that only categories associated with confidence probability values exceeding a specific level are added to the storyline. In this example, if a threshold of 0.8 is applied, the "ocean" category will not form part of the initial category list for the frame-level storyline.

At block 804, a subsequent frame has its categories list (and probabilities) adjusted and added to the storyline provided from the first frame. Any detected categories and associated probabilities of the subsequent frame are adjusted based on those from the first frame. The adjustment of the categories and probabilities of each new frame, based on the storyline to that point, assists with ensuring that any recent consistently-displayed categories are captured in the storyline for the current frame, even if not actually detected in the current frame. An example of the adjustment can be understood by way of example from the description of FIG. 9.

The technique proceeds for successive frames, each being adjusted based on the storyline to that point, until a scene transition occurs. A scene transition may occur when the categories present at the start of the storyline (i.e. from the first frame) are no longer detected (or not detected above a predetermined threshold); and particularly, are no longer present in the storyline even after an adjustment is applied to favor recent consistently-displayed categories. For example, from frame 674 in FIG. 7, "car" and "tree" have not been detected, and, assuming thresholding was applied, "ocean" did not form part of the initial category list; a scene transition may thus be determined to occur at frame 674. Other events for triggering a scene transition are contemplated and described below.

At block 806, the above technique for the previous scene restarts for the current scene, with the category list from the current frame (e.g. frame 676) being added to the storyline without adjustment, as occurred for the first frame at block 802.

The above technique repeats for successive blocks of frames (relating to scenes) until an adjusted listing of categories and confidence probability values is generated for each desired frame, providing a frame-level storyline of the video.

At block 808, the adjusted scene category lists and probability values for the frames are segmented based on the scene transitions to determine scenes for a scene-level storyline. In some cases, the storyline can be output to a database, the storyline including scene start and end times, scene categories (and confidence values) for the scenes, as well as optionally scene categories (and probabilities) for the frames.

Figure 9:
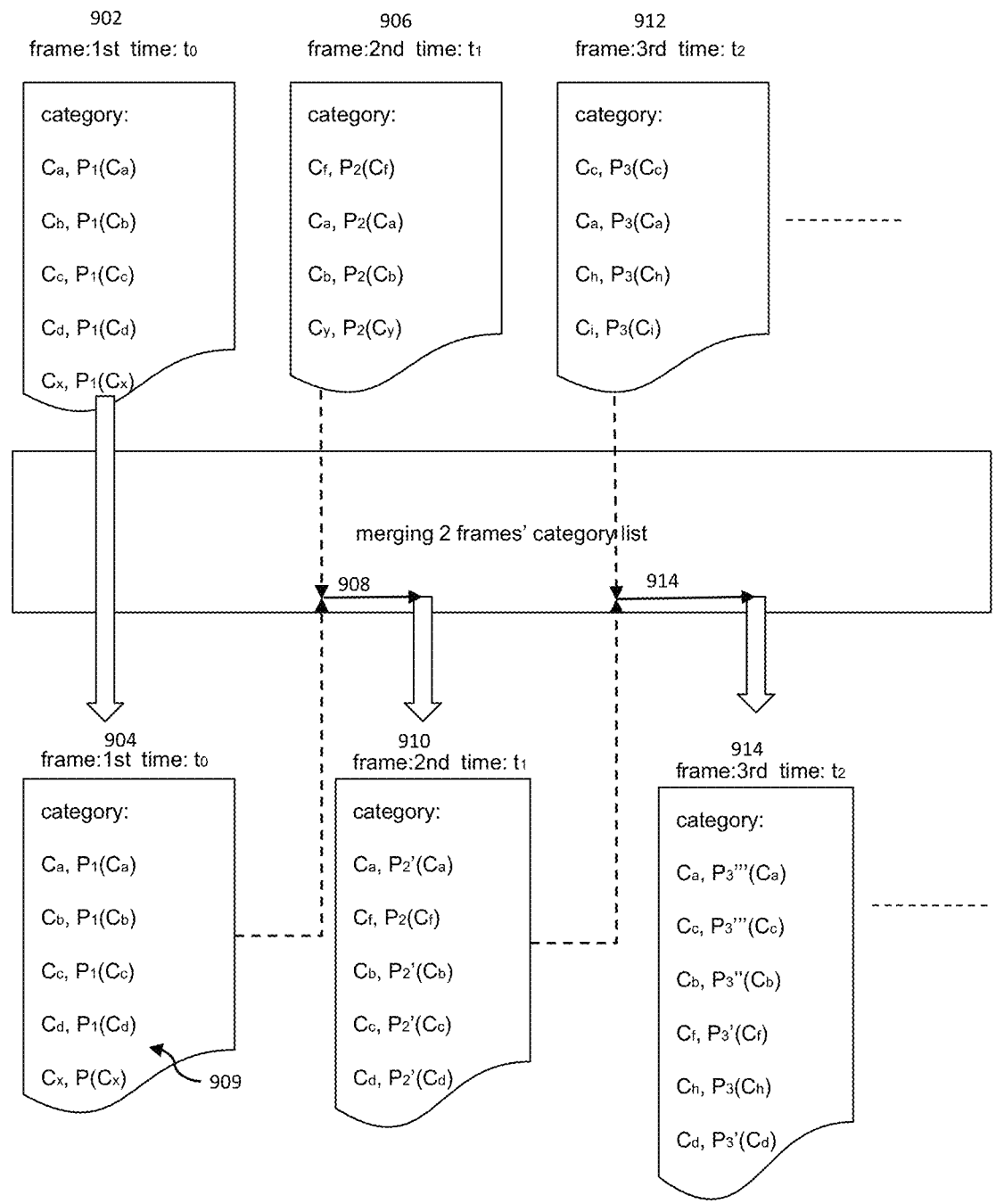
FIG. 9 illustrates the application of an embodiment of the method of FIG. 8 to three frames of a video.

FIG. 9 diagrammatically illustrates a particular embodiment of the method 800. Elements 902, 906, and 912 illustrate first, second and third frames, respectively, as received from the computer vision technique with associated scene categories and confidence probability values. Elements 904, 910, 914 illustrate adjusted scene categories and confidence probabilities of the frames, comprising the frame-level storyline of the video for each frame. For clarity, the frame indexes (first, second, third frame) throughout indicate a captured and frame from the video selected for processing, e.g. at 1 frame/second of video, this may not be equivalent to the actual frame number sequence from the original video.

At block 902, a first frame from a time $t_0$ having a set of determined categories $C_a \ldots C_x$ and associated probabilities $P_1(C_a) \ldots P_1(C_x)$ are received.

At block 904, a first category list of the storyline is generated by directly copying from the categories of the first frame.

In some cases, a threshold filter may be applied (shown at 909) as follows, limiting the number of stored categories per frame based on the recorded confidence probability values:

if $P(C_x) < P_{threshold}$ then remove $C_x$

At block 906, a category list with associated probabilities from a second frame at time $t_1$ is received.

At block 908, the adjusted category list of the first frame (904) is merged (block 908) with the received category list of the second frame (906) to provide an adjusted category list for the frame-level storyline (block 910), as at the second frame.

For merging, in instances where categories are detected in successive frames, it should be noted that the merge of two category probability is by union of events as follows:

$P(A \cup B) = P(A) + P(B) - P(A \cap B)$ where $P(A \cap B) = P(A) * P(B)$ if A and B are independent In the case of the category probability scoring, each category is independent between frames. So, for example, as between the category list pertaining to the first frame (904) and the category list of the second frame (906), to merge any category and probability pairings common between the two (e.g. $C_a$, $C_b$ between frames 1 and 2) for generation of the adjusted category list for use in the storyline for frame 2 (910), the determination can be as follows:

$P_{2'}(C_a) = P_1(C_a) + P_2(C_a) - P_1(C_a) * P_2(C_a)$

In some cases, if a category does not appear in consecutive frames, it is subject to a scale down factor. The scale down factor can be applied after a cool down period. For example, if the current frame to be added to the storyline is at timestamp n, and $P_{n-x}(C_y)$ still exists in the category process (i.e. in the storyline previous to that point), and there is no $C_y$ detected in the current n frame, then:

$P_n(C_y) = P_{n-x}(C_y) * S_{scale\_down\_factor}$ where
$S_{scale\_down\_factor} < 1$; $S_{scale\_down\_factor} > P_{threshold}$ where x is the cool down period. In an example, x can be twice the frame_capture_rate; but for analysis purposes, it can be set to 1. In the example of FIG. 9, the cool down period has been set to 1. For the second frame to be introduced to the storyline (906), $C_c$ and $C_d$ are not detected from the source video. The undetected data can then be copied to the second frame of the storyline (at 910) with the scale down factor applied. In this example, undetected categories drop down the storyline category list relative to the respective ranking in the previous frame (904). For clarity of illustration, each category list in FIG. 9 is ordered based on an ordering of the confidence probability value of the scene categories for each successive frame, showing that categories rise or fall in successive frames depending on which categories are detected.

In an exemplary embodiment of the present system, the scale down factor can have a value of 0.85 and the cool down period can have a duration of 3.0 seconds. In other exemplary embodiments, these variables can have different predetermined values; for example, 0.9 as the scale down factor and 2.5 seconds as the cool down duration, 0.95 as the scale down factor and 2.0 seconds as the cool down duration, 0.8 as the scale down factor and 3.5 seconds as the cool down duration, or the like.

The value was determined by examining videos selected from different categories and generate the storyline using various different settings then compare the results with the controlled case where these parameters are not applied. The mechanism to choose a setting that can produce least small gaps in between top category in scenes and least amount of false positive per frame within the selected scenes.

The method 900 then proceeds for sequential or additional frames until a scene transition occurs. In the illustrated example, a third frame with listed categories and probabilities (912) is merged with the then current storyline for the second frame (914) to provide adjusted categories for the storyline for the third frame (914). For the third frame, $C_d$ is still not detected, and since it has passed the cool down period, $P_3(C_d)$ is subject to scale down factor and after the calculation, it falls below the threshold and is removed from the storyline. However, $C_c$ is detected in the 3rd frame again, and the regular category merging process is applied, such that $C_c$ is promoted due to high percentage of $P_3(C_c)$.

Each time a scene transition occurs, the method illustrated in FIG. 9 is restarted. As discussed above in relation to method 800, a scene transition may occur, when the first frame's categories (from a given scene) have been removed due to the thresholding provided by the threshold filter equation described above, i.e. have dropped down far enough to fall below a set threshold. Upon restarting, the scene categories of the then-current frame are used, as at block 904. In an embodiment, once a category has been removed, it cannot be restored, even if it subsequently has a higher probability than the threshold.

In some cases, all frames for which for which categories and associated confidence probabilities have been received will be likewise processed. Once the process has continued to the end of the captured frame sequence, the building of the storyline, at the frame level, is complete.

As described, the system described herein can enable a scene category to be consistently detected between subsequent frames, and thus be promoted, indicating that it is prominent in an ongoing scene of the video. It further provides a way to diminish weighting of a category if subsequent frames do not detect such category; for example, $C_d$ in the example of FIG. 9 diminishes away. It further provides a way to promote a category even if such category is skipped for couple frames; for example, see $C_c$ in the example of FIG. 9, which is carried on even though it was not detected in frame 2.

In some cases, the frame-level storyline can be segmented based on the scene transitions into a scene-level storyline and output. The scene-level storyline comprises scene start and end times (based on the scene transitions) and scene-level categories. The scene categories of a scene comprise any categories detected above any set threshold at some point in the scene. To determine confidence probability values for such scene-level categories, the probabilities for each category within any of the frames of the scene can be averaged, and weighted based on the number of frames within which each category remains in the storyline. Accordingly, scene categories repeated between many frames of a scene will have a higher scene-level probability.

Figure 10A:
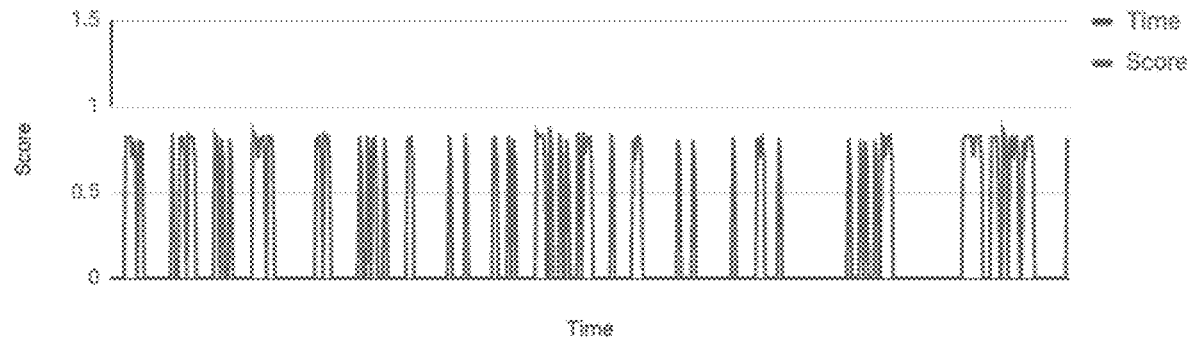
FIGS. 10A and 10B show the effect of varying a cool down parameter of the method of FIG. 8, respectively showing confidence probability score vs. time in a video for a 0 second and 3 second cool down period.
Figure 10B:
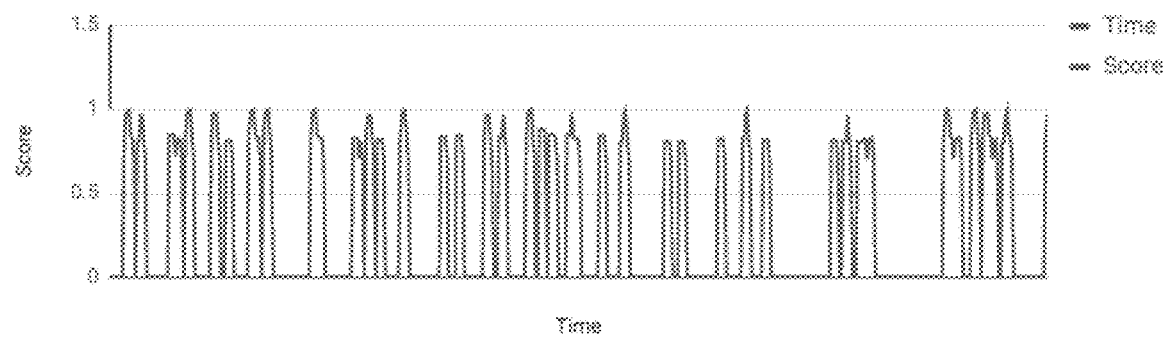

In some cases, the scale threshold can be a simple filter to eliminate low probability categories results from the computer vision category recognition process. For the cool down period, it can affect category connections between frames, where a larger cool down period will make a smoother storyline for a category but can also create more false-positive frames. In an example, FIGS. 10A and 10B show comparisons tracing one specific category for an example video with different respective cool down periods. FIG. 10A shows possible results of confidence probability score vs. time distribution with a 0 second cool down period. FIG. 10B shows possible results with 3 second cool down period. As shown, there are generally less small gaps between positive detection during the video timeline for a 3 second cool down period setting. As described, the scale down can be used for diminishing away a category, and can have a similar effect as a cool down period, but can provide another dimension to adjust the system.

In alternative embodiments, the method of FIG. 8 can be avoided such that a frame-level storyline is not effected. If the computer vision technique is particularly accurate, it may be preferable to avoid use of the method 800 and to rely instead on the categories and probabilities as received from the computer vision technique to provide a frame-level storyline.

Further, in alternative embodiments, scene transition determination may be based off of different triggers. For example, scene transition may be determined if the initial category with the highest probability drops from the storyline. Further, only changes to a particular predetermined set of categories (e.g. particularly important categories) may trigger a scene transition.

Given the storyline (for example, comprising scenes, scene categories and confidence probabilities), as well as a set of overlays from the overlay management module, the overlay selector module 126 can generate a list of insertion points in the video timeline for insertion of one or more selected overlays. The overlay selector module 126 determines points in the timeline to insert the selected overlays, based on, for example, a determination of a highest score achievable according to a selection criteria.

Overlays can be automatically selected by the system using selection criteria. The selection criteria can include relatedness of subject matter of the video (or its scenes) and the overlay; expressed based on the determined scene categories of the video and overlay categories of the overlay. In some exemplary embodiments, where the system inserts overlays for advertising purposes, the selection criteria can also include revenue optimization earned by displaying a particular overlay. In some embodiments, the selection criteria may be selected or tuned by the user using a graphical user interface.

In order to match an overlay to a scene, the overlay selector module 126 can generate a list of categories for a video's scene, each category can have start time and duration. The overlay selector module 126 can use this data to find the best overlay candidate for a given scene which shares a similar category and duration. In an embodiment, a match can be determined by first examining the potential overlays for one or more similar categories. In some cases, among the overlays having matching or similar categories, the overlay selector module 126 can also determine which of the overlays are closer in duration to the current scene. For example, there can be an overlay having the category of "car" and a duration of "10 seconds". In this example, a list categories from a video can contains these matching segments:

car-scene-segment1: start: 10 seconds, duration 5 seconds
car-scene-segment2: start: 120 seconds, duration 10 seconds
car-scene-segment3: start: 260 seconds, duration 20 seconds In this example, the overlay selector module 126 can choose segment2 due to similarity of category and duration.

In some cases, if there is no sufficiently similar categories in the video, the overlay selector module 126 can fall back to the manual selection method, either by the video's meta data or tagging, or to simply do not put this car overlay to this video.

In some cases, for category matching, to simplify the matching system and avoid traversing synonym or linguistic tree for a category word, the overlay selector module 126 can determine a match by finding an exact string match. In many such cases, the categories determined from the scenes are likely to already contain synonyms or similar wordings, and the overlay categories can also have many category tags to represent topics for that overlay. In other cases, the overlay selector module 126 can use a synonym tree, word embeddings, or other structure to determine matches between related or similar words.

Figure 15A:
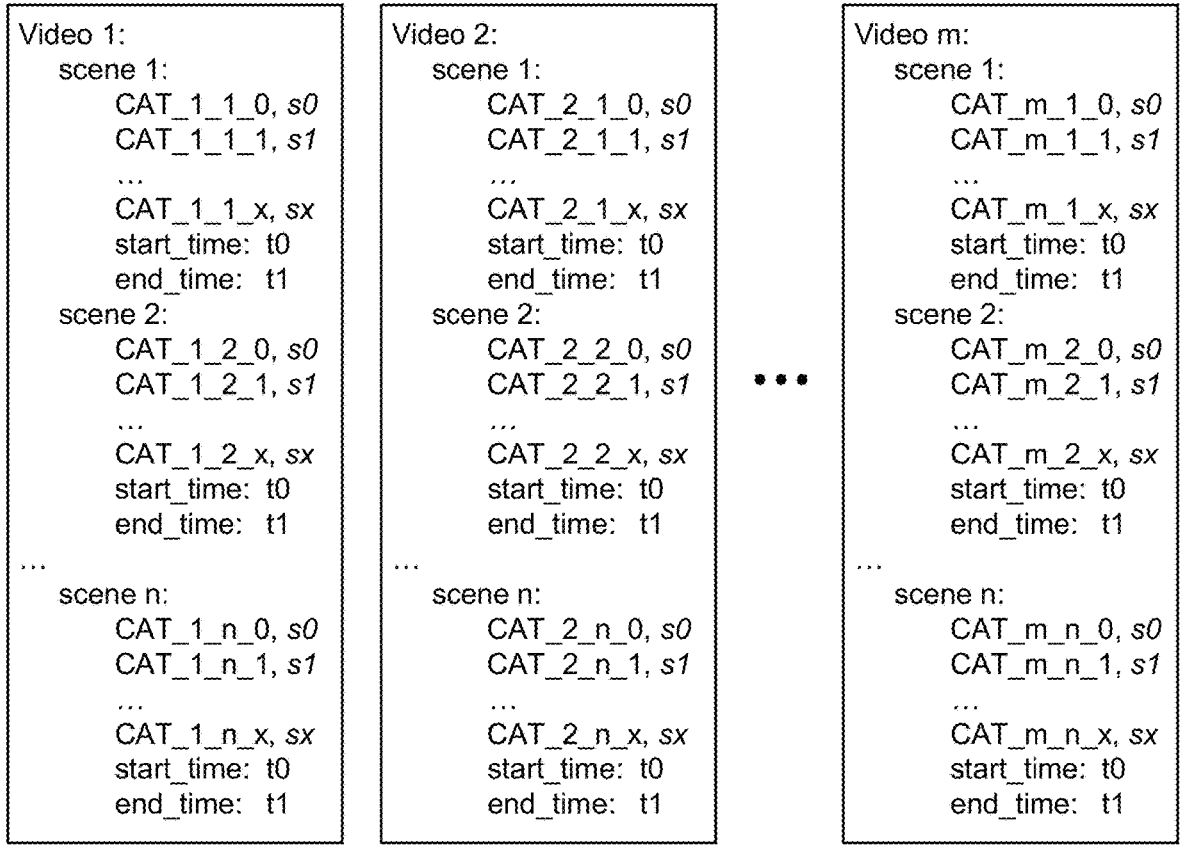
FIGS. 15A and 15B illustrates examples of data structures associated with videos and overlays, respectively.
Figure 15B:
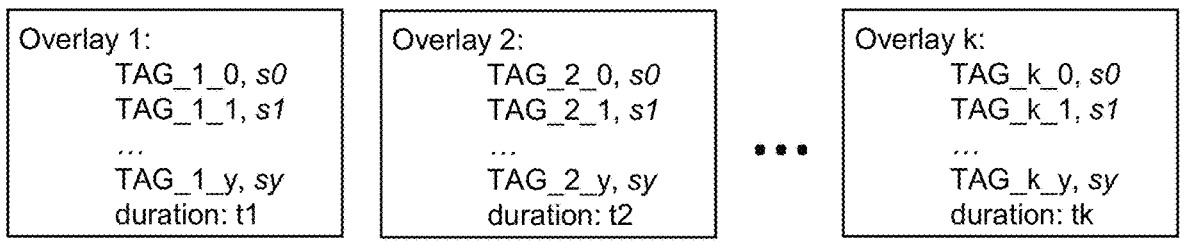

FIGS. 15A and 15B illustrates examples of data structures associated with videos and overlays, respectively. FIG. 15A illustrates an exemplary data output of the category determinations for multiple videos (Video 1, Video 2 ... Video m), each having multiple scenes (scene 1, scene 2 ... scene n). Each scene having one or more categories associated with it (for example, CAT_1_1_0, CAT_1_1_1 ... CAT_1_1_x) and a start time (t0) and an end time (t1) associated with it. Each category having a probability (for example, s0, s1, or sx) associated with it, generated by the neural network, having a floating value between 0% and 100%.

FIG. 15B illustrates an exemplary data associated with multiple overlays (Overlay 1, Overlay 2 ... Overlay k), each having multiple categories (also called "tags") associated with it (for example, TAG_1_0, TAG_1_1 ... TAG_1_y) and a duration associated with each overlay (for example, t1). The categories (TAG_k_y) are the category tagging from the overlay. These tagging are produced manually when the overlay creative was produced for a specific purpose or topics. In an example, a variety of synonyms can be included in the tagging for an overlay and provide with score (s0, s1 ... sy) to indicate how relevant the tag is to the overlay's topic. The score can have a floating value between 0% and 100%.

In the examples of FIGS. 15A and 15B, category matching can occur in two ways. In a first approach, the overlay selector module 126 determines a video scene matching a given overlay. Generally, the matching is from a scene to an overlay for a given video scene. For example, for scene CAT_a_b_c in the video, find matching overlays as in TAG_k_y. Then, for each matching overlay, a criteria scoring can be determined (as described below), and the item having the maximum score can be selected; for example, using:

$$\max((TAG\_1\_2.s2)*100*t1),(TAG\_3\_4.s4)*100*t3),\\(TAG\_k\_l\_i\ y.sy)*100*tk))$$

In a second approach, the overlay selector module 126 determines a matching overlay for a given video scene. For example, given overlay TAG_a_b,ta, find all matching video scene as in CAT_m_n_x. For each matching video scene, a criteria scoring is determined (as described below), and the item having the maximum score can be selected; for example, using:

$$\max((CAT\_1\_2\_1.s1)*100*(d2)),(CAT\_3\_4\_2.s2)\\*100*(d4)), \ldots (CAT\_m\_n\_x.sx)*100*(dn)))$$

where: d2 is the duration for Video 1, scene 2; d4 is the duration for Video 3, scene 4; and dn is the duration for Video m, scene n. Where duration is equivalent to the end time minus the start time.

In the above example, thus, the overlay selector module 126 preferentially selects longer scenes having a matching category.

Figure 11:
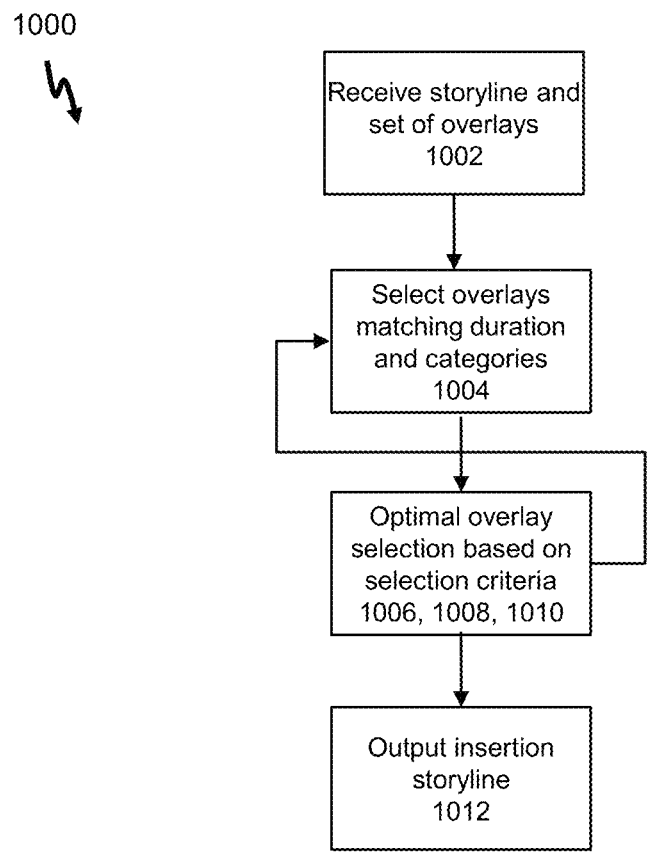
FIG. 11 is a flow chart of a method for automated overlay selection in accordance with an embodiment.

FIG. 11 illustrates an example method 1000 of overlay selection.

At block 1002, a storyline is received from the storyline generator module, as described herein. In an example, the storyline comprises, for each scene, scene categories, associated confidence probabilities, a start point and an end point.

At block 1004, for each scene category of each scene in the storyline, overlays are designated from the stored overlays, having overlay categories matching the scene categories, and with durations less than or equal to the scene durations. In other cases, instead of matching strings of scene categories with the overlay categories, matching may be based on semantic similarity.

At blocks 1006 to 1010, an overlay is selected for the scene from the designated overlays based on the selection criteria. Various techniques for selection are contemplated; an example an embodiment is described.

At block 1006, for each selected overlay, a score is generated based on the selection criteria. For selection criteria relating to relevance, i.e. selecting overlays to maximize for category matching between the overlay and the scene categories, the overlay score may be generated based on the following determination (though other methods of determination are contemplated):

For each matching overlay category matching to a scene category, 100*category probability confidence*Overlay duration The above allows the system to select an overlay and means that the selection score can be weighted on the category probability confidence and the overlay duration. Thus, among the selected overlays, those that match with higher probability and have the longest duration will have better score. Where in this case, the selected overlays are those that have an associated category matched to the scenes, or similarity to the scene, and equal or less then the duration of the scene.

At block 1008, the score may be normalized for each selected unique overlay against the sum of all scores to give a probability for each selected unique overlay. The Softmax function may be used. Given the following probabilities of categories $C_1 \ldots C_9$: $P_1 \ldots P_9$. Softmax($P_1 \ldots P_9$) yields ($p_1 \ldots p_9$) where all values add up to 1.0. Each $p_1 \ldots p_9$ value is proportional to the $P_1 \ldots P_9$.

At block 1010, an overlay may be randomly picked given each normalized score/probability, therefore the overlay with the largest normalized score will have the highest probability of being picked but will not necessarily be picked. Randomly picking an overlay based on the normalized score/probability can be used in some cases, and may be preferable in some instances, rather than merely using the highest score, because it gives other overlays with lower scores a chance to be displayed, to encourage overlays to be applied proportionally to the set of videos, rather than repeatedly using the same overlay(s).

Blocks 1006 to 1010 can be repeated for each scene or video for which overlay selection is desired. The selection of block 1010 can be configured to avoid duplicate selection of a given overlay.

Based on the method 1000, an insertion storyline is generated at block 1012, comprising a list consisting of entries with the fields: start time, end time, and overlay media. The insertion points may be dictated by the scene start times and end times.

As described above, in some embodiments the selection criteria comprises maximizing earned revenue. In such an embodiment each overlay may have stored as an overlay characteristic an amount of revenue for a period of time the overlay is displayed. In such embodiments, at block 1006 calculating a score for each selected unique overlay comprises a computation such as:

Overlay score=Sum(Matched Scene category confidence*Overlay Revenue*Overlay duration)

Further, in alternative embodiments, the monetary reward may be linked to the scene categories; for example, a given overlay may have a higher or lower monetary reward depending on the presence of particular scene categories (e.g. cell phone on screen, or famous actor John Patent on screen).

In further embodiments, additional selection criteria may be used.

Though in the above embodiments, overlay selection is described in some instances according to a singular criterion, selection may be based on a set of criteria, and may not be mathematically optimal to any one or any set of criteria. Notably, embodiments where optimizing for both a high relevance and revenue are also contemplated.

Referring now to the overlay insertion module 128, given the insertion storyline and the video, the overlay insertion module is operable to generate an output video with the selected overlays inserted throughout, such overlays being positioned and scaled appropriately for the video size. With the information from the overlay selector module, the overlay insertion module can place the overlay object to the appropriate entry time for the source video. The user may be provided the option in the overlay management module to veto or otherwise reconfigure the automated insertion of overlays.

Figure 12:
FIG. 12 is a user interface screen showing a video frame with scene categories and confidence probability values overlaid on the screen.
Figure 13:
FIG. 13 is a further user interface screen showing a video frame with scene categories and confidence probability values overlaid on the screen.
Figure 14:
FIG. 14 is a further user interface screen showing a video frame with scene categories and confidence probability values overlaid on the screen.
Figure 14:

Referring now to FIGS. 12 to 14, shown therein are examples of user interface screens with scene categories and confidence probabilities values overlaid to illustrate analysis by an embodiment of the method 800. Between the frames of FIGS. 12 and 13, we see visual content and the scene category probabilities have changed. Due to the scale down factor, most of the scene categories are maintained, and the same scene is maintained. Between frame of FIG. 13 and the frame of FIG. 14, the subject matter has changed more significantly, such that a scene transition is triggered.

In embodiments described above, the frame-level storyline is segmented into a set of scenes, based on detected scene transitions. In alternate embodiments, the scene transitions are not detected based on the continued presence of scene categories from the first frame of each scene; the method 800 is instead varied such that the frame-level storyline determination according to block 804 is maintained through the entire video, instead of resetting after each scene transition. This provides a continuous frame-level storyline throughout the video. In such an embodiment, scenes can be detected and used for overlay insertion based on application of clustering to the continuous frame-level storyline, instead of relying on rigid scene transitions based on a set rule.

Further, in some embodiments where a continuous frame-level storyline is generated, scenes may not be detected at all. In such embodiments, overlay insertion can be based on individual categories without consideration for scenes. Accordingly, a given overlay could be inserted for the entire time that one or more particular categories are onscreen, without regard to other categories.

In the above, a frame capturing rate of 1 frame/second has been described for processing by the computer vision technique; such a rate has been found to be satisfactory. The trade-off between higher or lower capturing rate is for performance vs. accuracy, if the system captured at very high rate, the chance of a better contiguous category storyline can be achieved however it will cost more of processing time due to number of frames. For example, for a video of 10 minutes at 60 fps, there would be 60*10*60=36000 frames.

With respect to frame size, the video can be of various resolutions; for example, 4K, 1080P, 720P, or the like. Providing the original frame resolution would be preferable, but in considering the cost/effect factor, experimental results indicate that a frame resolution at 640×480 is often sufficient. In some cases, for video resolution that is already lower than 640×480, the system can capture the same resolution as the video. In some cases, for video resolution that is above 480P, the captured frame can be down-scaled to 640×480 to save time and computing resources.

In further alternative embodiments, other types of media than video can be used by the systems and methods for insertion. For example, audio based overlays may be inserted to an audio broadcast, with necessary modifications, including an appropriate category classification technique.

Though the above has generally been described in relation to overlays for insertion during scenes of a video, in embodiments such overlays could instead be inserted before or after scenes, or apart from the video itself, such as a in a sidebar of a webpage.

For clarity with respect to term usage, the term "frame" refers to a single frame of a video. Individual frames of the video are processed to determine "scene categories" displayed in the respective frames, i.e. displayed objects or situations. Further, the term "scene" refers to a temporally adjacent set of frames sharing common characteristics, such as overlapping scene categories. The term "scene categories", as used in the context of a scene, refers to any determined categories displayed within the selection of frames making up the scene. Confidence probability values, indicative of a confidence in the determined categories may further be determined both at the "frame-level", i.e. confidence in the determination of categories in a given frame, and further at the "scene-level", i.e. confidence in the determination of categories in a given scene.

Although the invention has been described with reference to certain specific embodiments, various modifications thereof will be apparent to those skilled in the art without departing from the spirit and scope of the invention as outlined in the claims appended hereto. For example, though system is described above in some embodiments according to a configuration where most processing and manipulation of media occurs on a cloud server, such actions may instead occur locally at a client. The entire disclosures of all references recited above are incorporated herein by reference.

The invention claimed is:

1. A method for automated overlay insertion to a video, the method comprising:
   receiving the video and one or more overlays, the video comprising a plurality of individual frames grouped in frame groupings;
   associating each overlay with one or more overlay categories;
   for each frame grouping in the plurality of frames, passing the visual contents of the frame to a trained convolutional neural network, the convolutional neural network is trained to detect scene categories within each frame and a confidence probability value associated with each detected scene category;
   successively for each of the frame groupings, adjusting the confidence probability values associated with the respective scene categories for a current frame grouping based on preceding frame groupings, by:
      determining a confidence probability for a scene category as a union of the confidence probability for such scene category for the current frame grouping and the confidence probability for such scene category for the preceding frame grouping if such scene category was detected in the preceding frame grouping and detected in the current frame grouping; and
      multiplying the probability value for each scene category by a predetermined scale down factor if such scene category was detected in the preceding frame grouping and not detected in the current frame grouping;
   matching overlay categories to comparable adjusted scene categories;
   generating a selection score for each overlay category that is relative to the probability value for the matched adjusted scene category;
   randomly selecting an overlay from the one or more overlays, the probability for each overlay based on the respective selection score; and
   inserting the selected overlay into the video.

2. The method of claim 1, wherein each frame grouping comprises one frame.

3. The method of claim 2, further comprising determining a plurality of scenes in the video, each scene comprising one or more frames, each scene is delineated from a preceding scene when one or more scene categories detected in a preceding frame are not detected in a current frame, wherein adjusting the confidence probability values, generating the selection score, randomly selecting the overlay, and inserting the selected overlay are executed separately for each scene.

4. The method of claim 3, wherein scene categories are only considered detected if the associated confidence probability value is above a predetermined threshold probability.

5. The method of claim 4, wherein the predetermined scale down factor is greater than the predetermined threshold probability.

6. The method of claim 3, wherein each of the overlays are only selected if the duration of such overlay is less than or equal to the duration of the respective scene.

7. The method of claim 3, further comprising normalizing all the selection scores for the respective scene by applying a Softmax function to such selection scores such that such selection scores add up to one.

8. The method of claim 3, wherein the selection score is further relative to revenue generated by displaying the respective overlay.

9. The method of claim 3, wherein associating each overlay with one or more overlay categories comprises receiving overlay categories for each overlay from a user.

10. The method of claim 3, wherein the predetermined scale down factor is 1 except when the respective scene category was not detected for at least a predetermined number of preceding frames in which case the predetermined scale down factor is less than 1.

11. A system for automated overlay insertion to a video, the system comprising one or more processors and a data storage, the data storage storing the video and one or more overlays, the video comprising a plurality of individual frames grouped in frame groupings, the one or more processors in communication with the one or more memory units and configured to execute:
an overlay management module to associate each overlay with one or more overlay categories;
a storyline generator module to, for each frame grouping in the plurality of frames, pass the visual contents of the frame to a trained convolutional neural network, the convolutional neural network is trained to detect scene categories within each frame and a confidence probability value associated with each detected scene category, and to successively for each of the frame groupings, adjust the confidence probability values associated with the respective scene categories for a current frame grouping based on preceding frame groupings, by:
determining a confidence probability for a scene category as a union of the confidence probability for such scene category for the current frame grouping and the confidence probability for such scene category for the preceding frame grouping if such scene category was detected in the preceding frame grouping and detected in the current frame grouping; and
multiplying the probability value for each scene category by a predetermined scale down factor if such scene category was detected in the preceding frame grouping and not detected in the current frame grouping;
an overlay selector module to match overlay categories to comparable adjusted scene categories, to generate a selection score for each overlay category that is relative to the probability value for the matched adjusted scene category, and to randomly select an overlay from the one or more overlays, the probability for each overlay based on the respective selection score; and
an overlay insertion module to insert the selected overlay into the video.

12. The system of claim 11, wherein each frame grouping comprises one frame.

13. The system of claim 12, wherein the storyline generator module further determines a plurality of scenes in the video, each scene comprising one or more frames, each scene is delineated from a preceding scene when one or more scene categories detected in a preceding frame are not detected in a current frame, wherein adjusting the confidence probability values, generating the selection score, randomly selecting the overlay, and inserting the selected overlay are executed separately for each scene.

14. The system of claim 13, wherein scene categories are only considered detected if the associated confidence probability value is above a predetermined threshold probability.

15. The system of claim 14, wherein the predetermined scale down factor is greater than the predetermined threshold probability.

16. The system of claim 13, wherein each of the overlays are only selected if the duration of such overlay is less than or equal to the duration of the respective scene.

17. The system of claim 13, wherein the overlay selector module further normalizes all the selection scores for the respective scene by applying a Softmax function to such selection scores such that such selection scores add up to one.

18. The system of claim 13, wherein the selection score is further relative to revenue generated by displaying the respective overlay.

19. The system of claim 13, wherein associating each overlay with one or more overlay categories comprises receiving overlay categories for each overlay from a user overlay management module.

20. The system of claim 13, wherein the predetermined scale down factor is 1 except when the respective scene category was not detected for at least a predetermined number of preceding frames in which case the predetermined scale down factor is less than 1.

* * * * *